US005555317A

United States Patent [19]

Anderson

[11] Patent Number: 5,555,317
[45] Date of Patent: Sep. 10, 1996

[54] SUPERVISED TRAINING AUGMENTED POLYNOMIAL METHOD AND APPARATUS FOR CHARACTER RECOGNITION

[75] Inventor: Peter G. Anderson, Pittsford, N.Y.

[73] Assignee: Eastman Kodak Company, Rochester, N.Y.

[21] Appl. No.: 931,741

[22] Filed: Aug. 18, 1992

[51] Int. Cl.$^6$ .............................. G06K 9/62; G06K 9/48
[52] U.S. Cl. ......................... 382/159; 382/197; 382/224
[58] Field of Search ................................ 382/16, 15, 36, 382/27, 39, 253, 299, 224, 159, 187, 199, 198; 358/140

[56] References Cited

U.S. PATENT DOCUMENTS

| | | | |
|---|---|---|---|
| 5,003,490 | 3/1991 | Castelaz et al. .......................... | 382/157 |
| 5,019,903 | 5/1991 | Dougall et al. .......................... | 358/105 |
| 5,058,180 | 10/1991 | Khan ........................................ | 382/158 |
| 5,060,278 | 10/1991 | Fukumizu ................................. | 382/157 |
| 5,060,279 | 10/1991 | Crawford et al. ....................... | 382/156 |
| 5,063,601 | 11/1991 | Hayduk ................................... | 382/157 |
| 5,075,871 | 12/1991 | Weidman ................................. | 382/157 |
| 5,159,644 | 10/1992 | Martin et al. ............................. | 382/14 |
| 5,161,204 | 11/1992 | Hutcheson et al. ...................... | 364/826 |

OTHER PUBLICATIONS

P. Gallinari, S. Thiria, F. Badran, and F. Fogelman–Soulie, "On the Relations Between Discriminant Analysis and Multilayer Perceptions", *Neural Networks*, vol. 4, pp. 349–360, 1991.

William H. Press, Brian P. Flannery, Saul A. Teukolsky, William T. Vetterling, "Numerical Recipes in C.", *Cambridge University Press*, 1988.

G. W. Stewart, "Introduction to Matrix Computation", *Academic Press*, 1973, pp. 217–230.

Uma Srinivasan, "Polynomial Discriminant Method For Handwritten Digit Recognition", SUNY Buffalo Technical Report, Dec. 14, 1989.

Andrew R. Webb and David Lowe, "The Optimised Internal Representation of Multiplayer Classifier Networks Performs Nonlinear Discriminant Analysis", *Neural Networks*, vol. 3, pp. 367–375, 1990.

Charles C. Tappert, Ching Y. Suen, and Toru Wakahara, "The State of the Art in On–Line Handwriting Recoginition", *IEEE Transactions on Pattern Analysis and Machine Intelligence*, vol. 12, No. 8, pp. 787–808, Aug. 1990.

*Primary Examiner*—Jose L. Couso
*Assistant Examiner*—Matthew C. Bella
*Attorney, Agent, or Firm*—Raymond L. Owens

[57] ABSTRACT

A system that classifies or identifies hand printed or machine printed alphanumeric characters using an iterated least squares polynomial discriminant method is disclosed. Super-sampling of labeled training characters is performed prior to feature extraction. Feature extraction subsamples individual character images. The feature vectors and associated labelings are used to create a weight matrix. During iteration, the weight matrix, to be subsequently used for identification, is modified by determining which characters are incorrectly classified, or classified with too small a confidence, and replicating those characters during training to strengthen the correct classification. The correct classification is also strengthened by using negative feedback to inhibit incorrect classification by using negative values in the target vectors. The speed of the learning process is enhanced by maintaining intermediate matrices and step wise increasing the amount of each feature vector and the size of the sample set used during training. The memory efficiency utilization is enhanced by maintaining and modifying intermediate matrices and compressing the sparse binary features vectors.

13 Claims, 3 Drawing Sheets

SUPERVISED TRAINING AUGMENTED POLYNOMIAL METHOD AND APPARATUS FOR CHARACTER RECOGNITION

BACKGROUND OF THE INVENTION

1. Field of the Invention

The present invention is directed to a method and apparatus for characterizing or recognizing alphanumeric text characters particularly hand printed text characters and, more particularly, to an automated system in which a least squares pattern recognition method is iterated to produce a classification weight matrix using error correction feedback in which recognition test results are used to replicate (or increase the training weight of) poorly classified characters and to provide negative feedback for incorrect classifications, and where the resulting weight matrix is then used in automated identification processing of hand printed forms or characters or the on-line identification of characters entered on pen-based computers.

2. Description of the Related Art

Conventional methods of character pattern recognition, whether of machine printed characters or hand printed characters, fall into many classes including neural network based recognizers and statistical classifiers as well as template matching and stroke based methods.

Neural network based systems are characterized by plural nonlinear transfer functions which vary in accordance with some learning method, such as back propagation. The neural networks typically evolve discrimination criteria through error feedback and self organization. Because plural transfer functions are used in the educated recognition system, neural networks are not very well suited for implementation on general purpose computers and generally need dedicated special purpose processors or dedicated node hardware in which each of the transfer functions is implemented.

On the other hand, statistical based classifiers are more suited for implementation on general purpose computers. Statistical classifiers can be implemented using a number of different statistical algorithms. These algorithms generally deal with selected features of the characters and analytically determine whether the features belong to or are members of clusters of features which clusters define characteristics of the characters being recognized. In other words, if the features of an unlabeled character fall within the boundaries of a cluster of features which characterize a particular text character, then the probability is high that the character to be labeled corresponds to the character of the cluster.

One approach to identifying whether an unlabeled character falls within a cluster boundary is to compute the Hamming distance between an unlabeled character pixel array and the arrays of possible matching text characters. Another approach is to use a polynomial least mean square classifier with a quadratic discriminant function, such as described in Uma Shrinivasan, "Polynomial Discriminant Method For Hand Written Digit Recognition", State University of New York at Buffalo, Technical Report, Dec. 4, 1989, incorporated by reference herein.

The Shrinivasan classifier works as follows. A database of labeled, hand written alphanumeric characters (digits, upper case alphabetics, or the combination of the two) are converted to feature vectors, $\bar{v}$, and are associated with target vectors. The components of the feature vectors are F quadratic polynomials (features) formed from the character's pixel array to provide evidences of lines through the image. The target vector for each character is a standard unit vector $\bar{e}_{k(\bar{v})}$ with the $k(\bar{v})^{th}$ component equal to 1 and all other components equal to zero, where $k(\bar{v})$ is the externally provided classification for the character, for example 0,1,2, ...,9 or A,B, ...,Z or a combination. Standard numerical techniques are used to determine an FxK floating point weight matrix A to minimize the squared errors, $\Sigma_{\bar{v}}(A\bar{v} - \bar{e}_{k(\bar{v})})^2$, where the sum runs over all feature vectors and K is the number of classes, for example 10 digits or 26 alphamerics. The weights matrix, A, is then used to classify unlabeled characters by determining the largest component in the product $A\bar{w}$, where $\bar{w}$ is the unknown character's feature vector. Additional details of this method can be found in the above-identified paper which includes source code implementing the method.

The above described system along with other statistically based systems, such as described in U.S. Pat. No. 5,060,279, are one shot learning systems, that is, the weight matrix or equivalent database is created in a single pass over the set of labeled characters used to produce the matrix or database. Such statistically based classifiers provide a reasonably good classification system but generally do not have the accuracy of neural network systems. However, the more accurate neural network based systems are slower to learn, slower to identify characters and require more memory and computing hardware than the statistical classifiers. What is needed is a system which combines the advantageous accuracy of the neural network based systems with the speed and efficiency of the statistically based systems and which may be based on simple integer or bit arithmetic.

SUMMARY OF THE INVENTION

It is an object of the present invention to provide a high speed alphanumeric character classifier which can be implemented on a general purpose computer in a reasonable time period and which executes rapidly.

It is a further object of the present invention to provide a statistical character classifier with the classification accuracy of neural network classifiers.

It is also an object of the present invention to provide a statistical character classifier that classifies faster than neural network based systems.

It is another object of the present invention to provide a character classifier that uses less memory than a neural network based classifier implemented on a general purpose computer.

It is still another object of the present invention to provide a hybrid character classifier that provides the speed and efficiency of statistical classifiers along with the accuracy of neural network back proprocation type classifiers.

It is an additional object of the present invention is to provide a system that trains faster than a neural network based classifier.

The above objects can be attained by a system that creates a classification matrix which classifies or identifies hand printed or machine printed alphanumeric characters. The matrix is created using an iterated least squares polynomial discriminant method. During iteration the classification weight matrix, to be subsequently used for identification, is modified by determining which characters are incorrectly classified, or classified with too small a confidence, and replicating those characters during training to strengthen the correct classification. The correct classification is also strengthened by using negative feedback, or subtracting out of the misclassified target vectors, to inhibit an incorrect classification.

The speed of the learning process is enhanced by sub-sampling the training data during feature vector extraction, supersampling the training set and stepwise increasing the amount of the training set used, maintaining intermediate matrices and step wise increasing the amount of each feature vector used during training. Classification accuracy is enhanced by using features of at least two types, both based on quadratic monomials of the pixels called King and Knight features (so called because they resemble the squares in a chess board the respective piece moves to and from). The memory efficiency utilization is enhanced by modifying the existing weight matrix and compressing the sparse binary features vectors.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
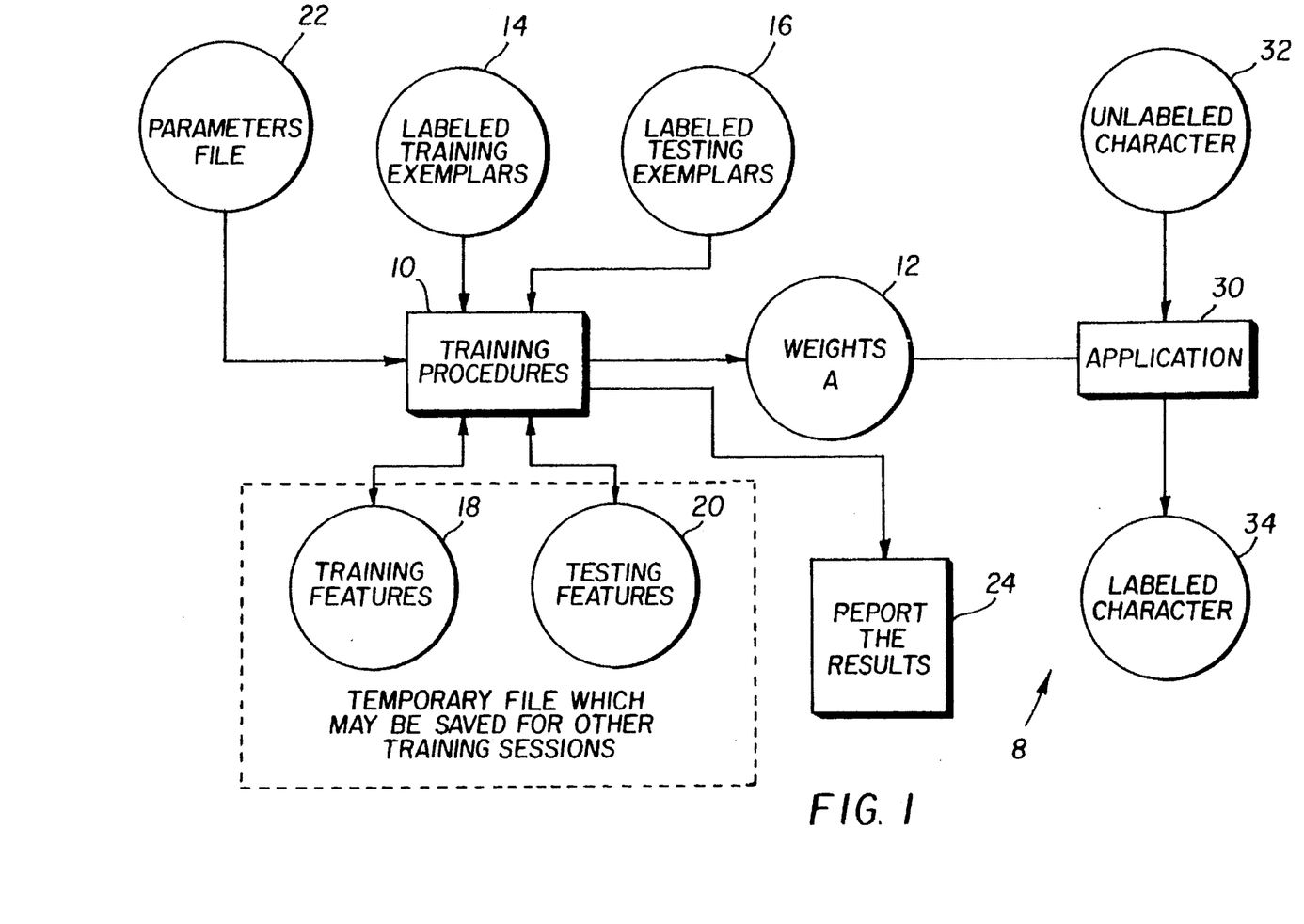
FIG. 1 is a block diagram of the present invention.

The system 8 of the present invention, as illustrated in FIG. 1 includes two programs or procedures, the first being the training procedure 10 which creates a weights matrix 12 from labeled training characters (exemplars) 14 and labeled testing characters 16. It is preferred that the training set 14 include at least 1000 different versions of each character to be identified or classified. These alphanumeric characters are conventionally captured, digitized and stored as pixel array images of preferably 20 by 30 bits. The capture process uses conventional optical scanners and processes capable of capturing characters printed on a substrate, such as paper, or entered on a digitizing tablet. The training procedure 10, which will be discussed in more detail with respect to FIG. 2, creates and uses training and testing feature vectors 18 and 20 created from the conventionally captured training and testing character sets 14 and 16. The training procedure also uses, as an input, parameters 22 which govern and control the training iterations. The training procedure 10 produces a results report parts of which are used to control training procedure iteration. The second procedure of the present invention is an application procedure 30 which uses the weights matrix 12 to convert an unlabeled, conventionally captured character 32 into the labeled character 34. The application procedure 30 will be discussed in more detail with respect to FIG. 4. The present invention preferably is implemented on a computer, such as a Sun WorkStation computer system, in a general purpose language, such as C. Pseudocode for the procedure 10 and application 30 is included herewith as an Appendix.

Figure 2:
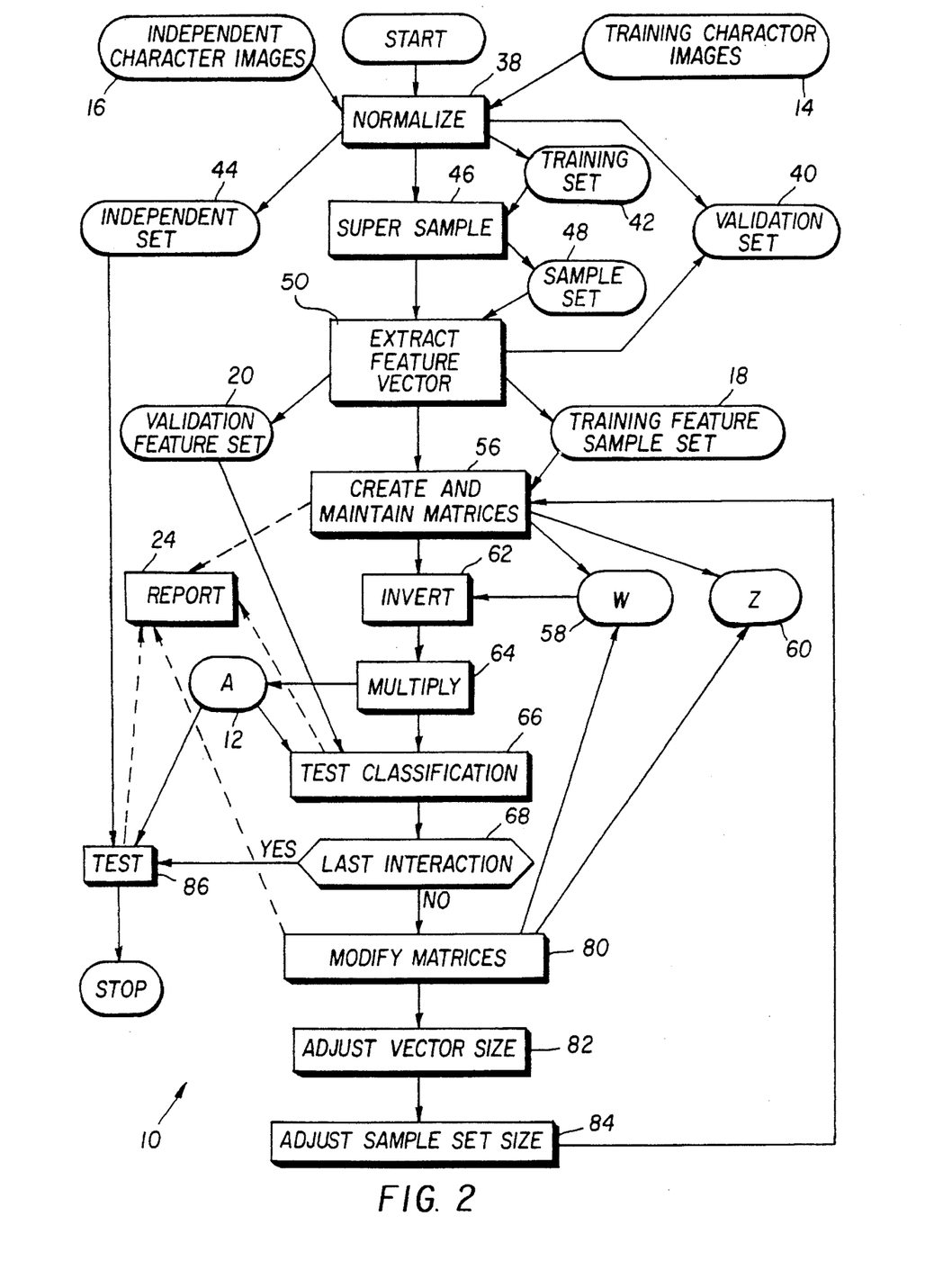
FIG. 2 is a database-operation flow chart of the training procedure 10 illustrated in FIG. 1.

As illustrated in FIG. 2, the training character images 14 are normalized 38 and used to create a validation image set 40 and a training image set 42. The training character images 14 are images of alphanumeric characters which typically would be found or are judged by the system developer to represent the range of characters which will be found in the target real world application. For example, if the application is to recognize hand written digits on mail, such as zip codes, the training character images would be a representative sample of the types of digits found on pieces of mail. The validation set 40 is typically 20% of the character images 14 while the training set 42 is the remainder. Although, a completely independent set of images can be used for the validation set. The normalization operation 38 involves conventional operations of reducing strokes in the image of the character to a single pixel in width or to 2–4 pixels in width, so that all strokes of each character are the same width. The normalization also includes conventionally dilating the image of the character until the exterior pixels of the character fill one or more of the pixels on the edge of the character matrix which is typically an array or matrix 20 bits (pixels) wide and 30 bits (pixels) tall (a 20×30 bit array). The independent character images 16, supplied by the user to be used for later testing must also be normalized, as discussed above, and used to create an independent image character set 44. The independent character images 16 would typically be the images that the ultimate user of the system has selected as representative of the types of characters which will be encountered in the real world application, such as reading zip codes.

The training set 42 is then super-sampled 46 to create a sample set 48 which will be used to extract features of each of the characters in the sample set. The super-sampling operation 46 merely replicates each character image eight times to create nine images from each single image in the training set 42. For example, if 1000 different versions of a character are provided in the set 14, 9000 will be stored in substitute sample set 48. The eight added images are created by shifting or offsetting each image by what is called a kings move in chess. For example, to create one of the images the original image is shifted up by one pixel, to create the second image the original image is diagonally shifted in the right upward direction by one pixel, to create the third image the original image is shifted right by one pixel, etc. As a result, nine training images or exemplars are created for every original image in the training set 42 which is called super-sampling. The super-sampling operation is described in more detail on page 1 of the Appendix.

Figure 3A:
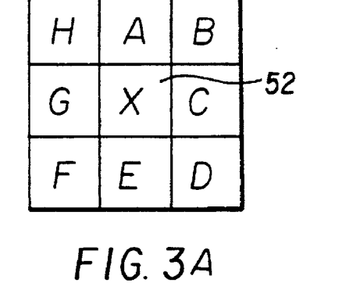
FIG. 3a and 3b illustrate the feature selectors used in the present invention.
Figure 3B:
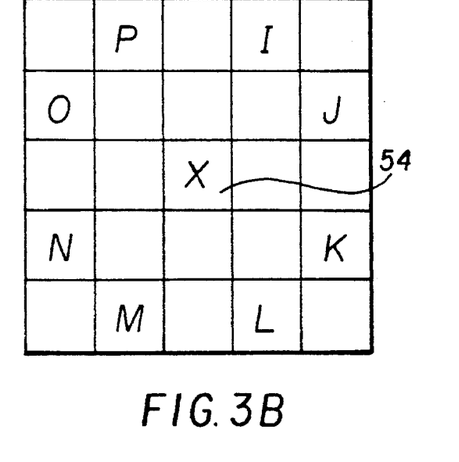

Once the sample set 48 is created, the system extracts feature vectors to create 50 the validation feature set 20 and the training feature sample set 18. The feature extraction operation conventionally uses quadratic polynomials to form a binary feature vector. Each character is represented by a 20×30 array of bits, with value 1 indicating a black pixel and 0 indicating a white pixel. The present invention uses two types of quadratic features: a King, as illustrated in FIG. 3A, and a Big Knight, as illustrated in FIG. 3b. A king feature is the product of two pixels that are a dilation of a king's move apart on a chess board (a "king's move", undilated is two pixels whose x coordinate and y coordinate both differ by 0 or 1). As illustrated in FIG. 3a the feature center 52, labeled x, can participate in up to four King features AE, BF, CG and DH. A Big Knight feature is illustrated in FIG. 3b and is the product of two pixels that are a Big Knight's move apart on a chess board, that is, two pixels whose x coordinates differ by 4 and whose y coordinates differ by 2 or vice versa. The feature center pixel 53 can be the center of up to four Big Knight features IM, JN, KO and LP. A feature is a conventional quadratic monomial of the form feature=$pixel_{pq}$ times $pixel_{rs}$ where rs and pq are the x,y coordinates of the two pixels being multiplied (Anded). The features detect line strokes of a given orientation passing through a given region. Using the above features, every pixel can be the feature center of nearly eight features (pixels not on the image are not used), so that nearly 20×30×8=4800 features can exist.

To improve processing speed, unconventionally, the features of each character in the sample set are subsampled during extraction in a predetermined order. That is, all features are not extracted from each exemplar in the supersampled training sample set 48. The coordinates of the feature centers used for extraction, which are the pixels in the 30×20 map that are visited during the extraction operation are determined by (11 k % 28, 11 k % 19) where % is a conventional C operator that returns an integer and k=1,. . . ,N where N is less than or equal to 28 times 19. The numbers 19 and 28 replace 20 and 30 for the feature centers, since centers very near the edges are of little use and these chosen parameters (28×19) work well in getting equidistributed feature centers. It is recommended that k be set at a value of at least 250, so that 250 features are used to create a 250 bit feature vector. k=600 is appropriate for machine printed characters while k=1500 is appropriate for hand printed characters. The subsampling results in an equidistributed subsample of the features of each character. The feature vector extraction and subsampling is described in more detail on pages 2, 3 and 10–13 of the Appendix.

Once the training feature sample set 18 is created, the present invention creates 56 and maintains two intermediate matrices 58 and 60 and outputs the matrices to report storage 24. The matrix 58 is inverted 62 and the results are multiplied 64 by the matrix 60 to obtain the weight matrix 12 which will be used for feature classification. The steps 56–60 execute the operations necessary to perform the mathematical operation of equation 1.

$$A = YX^T(XX^T)^{-1} \quad (1)$$

The steps necessary to execute equation 1 are all performed in the Shrinivasan method set forth in the report previously mentioned and are described in detail therein. However, the Shrinivasan method does not create and maintain the matrices 58 and 60 but rather destroys those matrices during the creation of the weight matrix 12. The steps 56, 62 and 64 are described in more detail in the Appendix on pages 2, 3, 5, 6 and 9.

Once the weight matrix 12 is created, the ability of that weight matrix to classify characters is tested 66. This test involves multiplying the weight matrix 12 times the feature vector for each image in the validation feature set 20 to produce a list of classification strengths for each character class which indicates the classification of the particular image feature vector. For example, if the weight matrix 12 is designed to classify the digits 0–9 the classification strengths list, as a result of the multiplication, will include ten items where the value in each item indicates the system's belief or probability that the character image corresponds to that digit. The item in the classification matrix with the highest such belief strength is the digit which the classification operation indicates corresponds to the image. For example, if the image is an image of the digit 7 and the classification operation is correctly classifying the image, item number 8 in the classification matrix will have the highest probability (seven corresponds to item eight since zero is the first character). In this example if the second item in the matrix, corresponding to the digit one, has the highest probability then the image is being misclassified. The test classification operation 66, in addition to creating the classification matrix for each of the images in the validation feature set 20, compares the classification with the actual identified character and indicates whether the character is correctly classified or misclassified in a report 24 or database used to indicate how well the weight matrix A is classifying the characters. This indication is performed by creating a comparison matrix whose (i,j) entry gives the percent of the characters of class i that were classified as class j. The testing and determinations as to misclassification is described in more detail on pages 3 and 8 of the Appendix.

Once the test classification operation 66 is completed, a determination is made 68 as to whether the last iteration of the loop has been performed. The iteration on the weight matrix 12 creation operation can be performed until all of the characters in the feature validation set are recognized with some efficiency such as 98%. However, experimentation has indicated that iterating for 20–50 cycles will result in the classification accuracy equal to or exceeding a multi node neural network. For example, 20 iterations will result in a weight matrix with a performance exceeding 97% on digits only, 95.5% on upper case alphabetics, and 88% on mixed upper and lower case alphabetics.

To improve the performance of a weight matrix 12 in classifying characters the present invention iterates on the weight matrix creation operation by increasing the representation of incorrectly classified exemplars and exemplars classified with low confidence (called together poorly classified or hard to train exemplars) in the training set. As described above, the weight matrix 12 is determined in accordance with equation 1 and as previously discussed the intermediate matrices 58 and 60 are separately maintained as illustrated in equations 2 and 3 below where n is the number of training exemplars. In these equations all vectors are treated as column vectors, so the products are outer products, not inner or scalar products.

$$Z = YX^T = \sum_{i=0}^{n} \bar{e}_k \bar{x}_i^T \quad (2)$$

$$W = XX^T = \sum_{i=0}^{n} \bar{x}_i \bar{x}_i^T \quad (3)$$

where $e_k$ is the target vector and $x_i$ is the feature vector. In the present invention the hard to train exemplars are used to modify 80 the matrices 58 and 60 by repeating the hard to train exemplars and providing a negative classification weight to the classification that was ill-classified. The hard to train exemplars are repeated to increase the multiplicity $m_k$ (which corresponds to the epoch or iteration) such that:

$$Z = \sum_{i=0}^{n} m_i \bar{e}_k \bar{x}_i^T \quad (4)$$

$$W = \sum_{i=0}^{n} m_i \bar{x}_i \bar{x}_i^T \quad (5)$$

where Z as defined above is the matrix comprising the sum of the outer products of feature vectors and their classifications and W is the matrix comprising the sums of outer product squares of feature vectors where the vectors are column vectors, so their transposes are row vectors. If a feature vector exemplar, $\bar{x}$, of class k is ill-classified, there is another class, j, such that $(A\bar{x})_j > (A\bar{x})_k \theta$ where $\theta$ is a confidence threshold which essentially measures how close the probabilities of the classifications are to each other. Based on the confidence being below the threshold the $j^{th}$ activation for $\bar{x}$ is lowered by specifying, on at least one epoch or iteration, that a negative $j^{th}$ classification weight is to be used for this exemplar. For example, in iteration or epoch 2, for every ill classified $\bar{x}_i$ add $(2\bar{e}_k - \bar{e}_j)\bar{X}_i^T$ to Z and add $\bar{x}_i \bar{x}_i^T$ to W. In another example, assume that we have a character that looks somewhat like a "3" and somewhat like an "8" but is actually supposed to be classified as a "3". Such a character could produce a classification strength list such as:

| Class | 0 | 1 | 2 | 3  | 4 | 5 | 6 | 7  | 8 | 9 |
|-------|---|---|---|----|---|---|---|----|---|---|
|       | 0 | 0 | 0 | .9 | 0 | 0 | 0 | .7 | 0 |   |

If the confidence threshold indicates that 0.7 is too close to 0.9, the system would retrain the character by modifying its target from:

(0, 0, 0, 1, 0, 0, 0, 0, 0, 0)

to:

(0, 0, 0, 10, 0, 0, 0, 0, −5, 0)

The above target would be used in the 10th pass (epoch). The −5 helps the system to separate the classification of 3's that look like 8's away from the classification of 8's.

The confidence threshold, θ, is raised or lowered from one epoch to the next to try to keep the number of ill-classified exemplars near a specified fraction of the training set. Retraining of 20% of the training exemplars works well. Retraining a larger fraction causes large oscillations; e.g., the conflicting classification between the character classes "3" and "8" will cause almost all of both characters to flip between all one or the other. With the 20% retraining fraction, a reasonable boundary between the two classes is determined quickly. The operation of modifying the matrices and adjusting the confidence level are described in more detail on page 3 of the Appendix.

Once the matrices are modified 80, the present invention adjusts 82 the size or amount of each feature vector in the training set 18 used during the classification matrix creation operation by a predetermined amount. Adjusting the size of each feature vector used provides an opportunity to speed up the process of determining a good weight matrix for character classification. Because of the ordering of feature extractions, a feature vector with F features is a prefix of a feature vector with F+F' features. Consequently the corresponding matrices, $Z=YX^T$ and $W=XX^T$, for a small feature vector are submatrices of those for larger feature vectors. Prior to training, the largest size feature vector that is appropriate is chosen (feature vectors of 1250 features for digits and 1600 features for alphanumerics are an acceptable size although larger vectors will provide enhanced classification accuracy, however, feature vectors of 1500 features are typical for general recognition problems in the English language), vectors of the chosen size are created for every character to be processed, either in training or testing. The system then maintains weight matrices that use only a prefix of that vector, and testing ignores a feature vector's postfix. For a character used in training, if that character fails to be classified properly by the current weight matrix, its full feature vector is used to update Z and W. As described above, an epoch or iteration consists of a (possibly sub-sampled and/or supersampled) pass over the training data. After each epoch, a larger and larger submatrix of Z and W, is chosen to compute the new weight matrix. For example, assume that each feature vector includes 4800 features or bits. If the first iteration uses a prefix of 1000 features and the size of the feature vector is increased by 200 features on each iteration the 20th iteration will use all 4800 features. Starting with at least 100 bits of each of the features vectors and increasing by an equal amount for each iteration until the last iteration equals the total number of features is an appropriate approach to increasing the size of the feature vector used. Although a minimum increase of 100 bits is recommended on each iteration.

The form that the training algorithm takes is now:

initialize the matrices Z=0 and W=0
initialize f, the number of features to be used
    for epoch count iterations
        for every training exemplar's feature vector, $\bar{x}$
            if $\bar{x}$ is poorly classified by the current $A_f$
                add $(2\bar{e}_k - \bar{e}_j)\bar{x}_i^T$ to Z
                add $\bar{x}_i \bar{x}_i^T$ to W
        increase f
        compute $A_f = Z_f W_f^{-1}$ where F features will be calculated and used to build Z and W, but only f features will be used in classification, $W_f$ denotes the upper left f×f submatrix of W, $Z_f$ denotes the first f columns of Z and $A_f$ denotes the resulting k×f weights matrix. Additional details of vector size adjustment 82 are provided on page 3 of the Appendix.

Once the amount of each vector which will be used in the training set is adjusted, the sample set size used in the operation, measured from the first sample, is adjusted 84 in accordance with 2 K/E where K is the number of the current iteration and E is the total number of iterations which will be performed. The training set size becomes 100% in the middle epoch and stays at 100% during the remainder of the iterations. For example, if the set 18 includes 1000 feature vectors and 20 iterations are to be performed, the first iteration uses the first 100 feature vectors of the set 18 and the last iteration uses all of the feature vectors of the set 18. In this way the system linearly ramps up in the amount of the sample set which is actually used during classification matrix creation. Additional details of the sample set size adjustment are provided on page 2 of the Appendix.

Once these adjustments have been performed the system again cycles through another computation operation. At the end of the matrix creation cycle the independent character set can be tested 86 using the application procedure 30 of FIG. 4.

The computation involving equation 1 appears to require that several arrays be built, multiplied, and inverted. Some of these matrices are very large. For example, when the system is dealing with N training patterns or characters and F features, and K character classifications, the matrices have the following dimensions:

| array | dimensions |
|-------|------------|
| A     | (K,F)      |
| Y     | (K,N)      |
| X     | (K,F)      |

However, because of the simple nature of these matrices and the contexts in which they are used, some of them do not need to be explicitly stored in the manner referred to in equation 1. In particular, the present invention avoids storing the two matrices X and Y (recall that the $K^{th}$ column of Y is a unit vector giving the classification of the $K^{th}$ training pattern; the $K^{th}$ column of X is the binary feature vector of the $K^{th}$ training pattern). The present invention produces, the matrices $Z=YX^T$ and $W=XX^T$ on the fly, having dimensions (K,F) and (F,F), respectively. The system initializes Z to zero and for each training pattern, if its classification is j, the system adds its feature vector to the $j^{th}$ column of Z. The system initializes W to zero and for each training exemplar's feature vector, $\bar{x}$, the system adds its outer product square, $\overline{xx^T}$, to W. That is, add $x_i x_j$ to $W_{ij}$ for every subscript pair, ij. Since an outer product square is symmetrical, W is symmetrical, and we only have to accumulate on the lower triangle. Since the feature vector is a sparse binary vector, we only have to add it to selected rows of W. An important consequence of the elimination of X and Y is that there is no storage penalty for a large training set.

To reduce the size of the feature vector sets 18, 20 and 44 the feature vectors are preferably compressed using a conventional compression technique which substitutes subscript differences for the non-zero elements of the feature vector.

Figure 4:
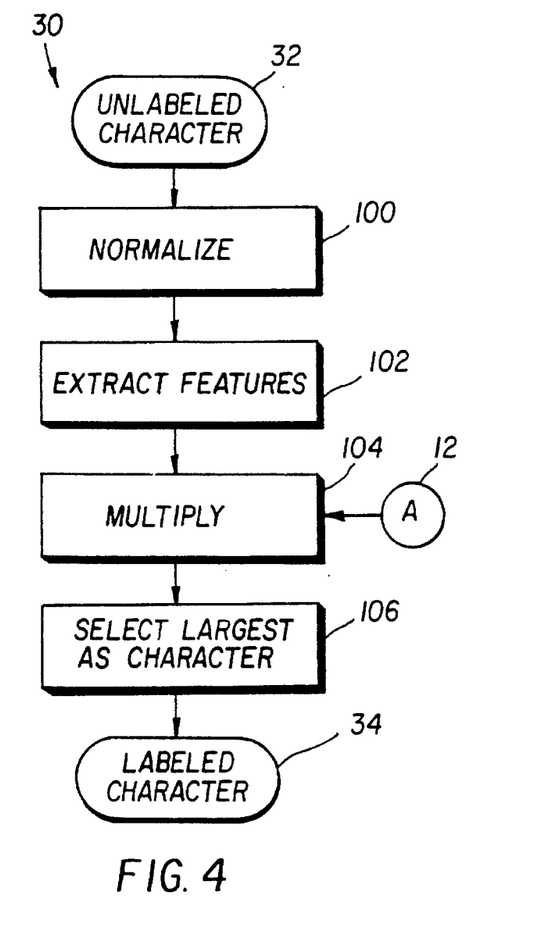
FIG. 4 illustrates the operations of the application 30 depicted in FIG. 1.

The application procedure 30 which uses the resulting weight matrix 12 to classify unlabeled characters, as illustrated in FIG. 4, starts by normalizing 100, as previously discussed, an unlabeled character which has been previously captured and digitized as a 20×30 bit array. The features of the unlabeled character are extracted 102 using the extraction method previously discussed and the feature vector is multiplied 104 times the weight matrix 12 to produce the classification matrix or list of classification probabilities. The largest probability corresponds to the classification of the character and is used 106 to label the character 34. In practice step 106 can include a comparison of the classification using the confidence factor previously mentioned to reject characters that can then be classified by a human. This operation 104 is illustrated on pages 7 and 8 of the Appendix.

Other features than the King and Big Knight, as described above, can be used in extracting the feature vectors from the sample sets. For example, dilation factors other than those shown above such as King and Knight moves to the periphery of larger squares. Further fuzzy line features which extend over several bits can also be used. The present invention could be implemented using a technique in which the weight matrix is used in the real world application, such as mail sorting, and misclassified mail that was sorted to the wrong end point is used as part of the training exemplars for another run. However, the end user generally prefers that an item be rejected so that it can be classified by a human rather than allowing misclassification to occur. The present invention provides for increasing the representation of poorly classified characters and negative feedback of misclassified characters. The increase in the representation corresponds to the iteration while the negative feedback is fixed. It is possible to provide a different multiplicity for poorly classified characters and increase the negative feedback for misclassified characters. However, experiments indicate that adjusting the values to larger than the ones discussed herein can lead to oscillating rather than smoothly converging behavior. Especially, when the negative feedback is as large as the positive feedback, the system may be unable to converge to a well-behaved classifier The invention has also been described with respect to a feature vector prefix that grows to the full vector by the last iteration. It is possible to stop the growth at some point such that the prefix in the last iteration is not the full feature vector. This will enhance processing speed, but there may be some loss of classification accuracy.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

Main flow of the training procedure:

```
{
    Create features files (if necessary). At the
    time the features files are created, make up
    to nine feature vectors for each training
    exemplar by shifting the image's pixels down,
    down-left, down-right, up, up-left, up-right,
    left, and right, as well as leaving the image
    fixed, prior to the extraction of the
    features.
    for epoch = 1 to training_epochs
    {
        train( epoch );
        test( epoch );
    }
{
train( epoch )
}
    if epoch == 1,
        feat_now = feat_low;
            (feat_now is the number of features
            currently used in testing and in
            creating a weights matrix, A.)
    Initialize the matrices, W and Z, to 0
    (W maintains the sum of feature vector
    outer product squares.) Z maintains the
    sum of target vector & feature vector
    outer products.)
    Prepare the fetch routine to fetch the test
    data.
    Determine the fraction of training exemplars
    to use:
        fraction = max( 1.0, 2 * epoch /
        training_epochs )
    An equidistributed, quasi-random roulette
    wheel is used rather than a white-noise
    pseudo-random roulette wheel (such as one
    based on drand48( )), which is based on the
    two adjacent Fibonacci numbers, F2 = 1,346,269
    and F1 = 832,040. The filtering process uses a
    static variable, named "mem" ("memory"), which
    is updated via the rule:
        mem = (mem + F1) % F2
    The roulette wheel simulation is then the
    comparison:
        (if( mem < fraction * F2 ) process this
        exemplar.)
    for character_no = 1 to training_set_size
    {
        Fetch the feature vector ("FV") and
        classification_code of the next training
        exemplar
        Accept or reject this character based on
        "fraction":
        if we accept this character
            if epoch == 1 or train_testings() <
            desired_confidence,
                train_it( epoch );
    }
    if epoch > 1,
        Report the performance of the present
        classifier on the portion of the training
        data that was employed.
    if percent_trained < percent_train_goal,
        Increase desired_confidence, so more will
        get trained:
        desired_confidence =
        max (desired_confidence+1, max_con)
    else,
        Decrease the desired confidence so fewer
        will get trained:
        desired_confidence =
```

11
-continued

```
            min (desired_confidence-1, 0)
        if epoch > 1,
            feat_now = max ( feat_step + feat_now,
                feature_count )
        Create the weight matrix for feat_now
        features: call "solve_for_A()"
        Convert the floating-point matrix A to the 16
        bit integer matrix IA which will be used
        immediately by "test" and in the next epoch by
        "train".
        The conversion is to "short int" (16 bit),
        which uses the maximum number, max-A, in A,
        and uses:
            IA[i][j] = (short int) ( 1000.0 * A[i][j]
                / max_A ).
        so the elements of IA have absolute values of
        at most 1000. Save the matrix IA in an
        external file. The weights are stored in
        ASCII.
}
train_it( epoch )
{
        The reinforcement increment we use is
        "reinforce = epoch"
        The inhibition decrement we use is
        "neg_reinforce = epoch/2"
        if epoch > 1,
            Determine the strongest incorrect
            classification for this exemplar
            (This value can be saved as a side-effect
            in "testing()".)
            The index is "inhibit" -- and we will
            inhibit it.
        else,
            inhibit = 0
        Add reinforce * FV to the column
        classification_code of Z
        if epoch > 1,
            Subtract neg_reinforce * FV from the
            column inhibit of Z
        Add the outer product square, FV*FV', to W.
}
solve_for_A()
{
        Copy the integer array, W, into a temporary
        floating work area, xxt.
        Use the routine "ludcmp" (L-U decompose) to
        convert xxt (in place) to its lower and upper
        triangle factors.
        Use the routine "lubksb" (L-U back
        substitution) to determine the rows of the
        weights matrix A.
        (The book, NUMERICAL RECIPES IN C by Press, et
        al, Cambridge Univ. Press 1988, provides the
        principles for this.)
}
```

This routine is used during training (or can be used independently) to determine the performance of the current classifier on the testing data (more properly called the cross-validation data).

```
test(epoch)
{
        Prepare the fetch routine to fetch the test
        data.
        for character_no = 1 to testing_set_size
        {
            Fetch the feature vector and
            classification_code of the next testing
            exemplar
            Call the routine, "testing()"
        }
        Report the performance of the present
        classifier on the testing data, based on
        information collected in "testing()".
}
testing()
```

12
-continued

```
{
        Multiply the feature vector, FV, and the
        weights matrix, IA, to get the classification
        strengths vector, CSV.
        If CSV is all zeros, this character is a
        "reject".
        Let max_index be the index of the largest
        value in CSV, max_strength, and
        runner_up_index be the index of the second
        largest, runner_up_strength.
        if max_index == classification_code
            (This classification is "correct".)
            Move the value in runner_up_index to
            "inhibit" confidence = ( max_strength -
            runner_up_strength ) / con_gap;
                "con_gap" is a parameter we have
                experimented with
                Combined with a "desired confidence"
                of 80,
                we found a value of con_gap = 50 to
                be useful.
            return confidence
        else,
            (This classification is "wrong".)
            Move the value in max_index to "inhibit".
            return 0
}
```

The following C code is used to perform L-U decomposition using the symmetric Cholesky method. This method is appropriate for symmetric matrices with a dominant main diagonal. To guarantee the large enough main diagonal so that pivoting can be avoided, augment the diagonal of the matrix W by 10 at initialization time.

The subscripts go from a low-bound of 1 to high-bound of n.

```
"forall( i, j, k )" is short for "for( i = j; i <= k;
i++)"
ludcmp( a, n ) int n; float **a;
/* a is an nxn floating-point matrix to be replaced by
its L-U decomposition */
{
        int i, j, k;     /* indices */
        float vii, uii, uij;    /* temporary storage
*/
        forall( i, 1, n ) {
            uii = a[i][i];
            forall( k, 1, i-1 ) {
                uii -= a[k][i] * a[k][i];
            }
            vii = a[i][i] = sqrt( uii );
            forall( j, i+1, n ) {
                uij = a[i][j];
                forall( k, 1, i-1 ) {
                    uij -= a[k][i] * a[k][j];
                }
                a[j][i] = a[i][j] = uij / vii; /*
L'=U */
            }
        }
}
```

How feature vectors are extracted.

The variables whose names are of the form "use . . ." should be global control flags that are provided in the parameters file 22. This will give the designer flexibility to experiment with different approaches to creating an efficient weight matrix.

```
create_feature_vect()
{
        row = col = 0;
```

```
/* (row,col) is pixel center for king, knight,
and self features */
feat_val = 0; /* accumulate number of non-zero
features */
/* create one feature whose value is always =1
*/
out( 1, 1 );           /* constant */
while( feature_index < feature_count )
{
    */ we use the following ordering for
    feature centers: */
    row = ( row + DEL ) % ROW;
    col = ( col + DEL ) % COL;
    /* where ROW = 28, COL = 19, and DEL =
    11 */
    /* this gives an equidistributed
    collection of feature centers. We cannot
    use, nor do we need approximately 20x30x8
    = 4,800 features */
    if( ( row > last_row ) || ( col >
    last_col ) ) continue;
    if ( NO_VAL == (this_pix = PIXEL( row,
    col )) ) continue;
    /* NO_VAL=9, indicating the pixel is not
    on the image */
    if( use_self ) out( this_pix,
    this_pix);       /* self */
/*****************************************************/
    /* In the following, 'D' denotes a small
    integer for a box, centered at (row,
    col), from which we extract the feature.
    Kings and Knights refer to the move
    directions of those chess pieces to
    obtain the two pixels which form a
    feature.
    Features with more than two pixels are
    possible. In those cases, a much larger
    set of features needs to be sub-sampled
    into a smaller collection. */
    if use_D_king,
        determine the values, 0, 1, or
        no-such-feature, for the following
        four potential features, which
        resemble an elongated chess king's
        moves on the periphery of a [D]x[D]
        square. Let R=[D/2] (R stands for
        radius, D for diameter).
        We have used D=3, 5, and 7 for king
        features:
        the four features are:
            pix(row-R,col-R) &
            pix(row+R,col+R)
            pix(row-R,col) & pix(row+R,col)
            pix(row,col-R) & pix(row,col+R)
            pix(row+R,col-R) &
            pix(row-R,col+R)
        "pix(i,j)" denotes a pixel whose
        value is 0, 1, or 9 (9 denotes off
        the image) corresponding to the
        character currently being processed.
        If either operand of "&" is NO_VAL
        (= 9), the feature is not completely
        contained within the image, so it
        does not exist.
        otherwise, the operands are 0 or 1,
        and "&" denotes logical product.
/*****************************************************/
    if use_D_knight,
        determine the values, 0, 1, or
        no-such-feature,
        for the following four potential
        features, which resemble an
        elongated chess knight's moves on
        the periphery of a [D]x[D] square.
        Let R=[D/2], and S=[R/2].
        We have used D=5 so (R=2, S=1) and 9
        so (R=4 and S=2) for knight
        features.
        the four features are:
            pix(row-R,col-S) &
            pix(row+R,col+S)
            pix(row-R,col+S) &
            pix(row+R,col-S)
            pix(row-S,col-R) &
            pix(row+S,col+R)
            pix(row-S,col+R) &
            pix(row+S,col-R)
/*****************************************************/
    }
}
```

When creating a file of feature vectors, it is convenient to use a two-level compression scheme. The feature vector, uncompressed, may be up to 1,500 unsigned character values, all of which are 0 or 1.

First, the non-zero features are a sparse subset of all the features, so create a list of the subscript positions of the non-zero ones. This must be an array of 16-bit integers.

The list of non-zero features is monotonically increasing, and, with very few exceptions, the difference between two successive such subscripts is less than 255. The subscripts are replaced with a list of subscript differences, most of which can be represented as an eight-bit integer. (The exceptional cases in which a difference exceeds 254, can be stored in 24 bits, using standard escape-coding techniques.)

I claim:

1. A method of character classification, comprising the steps of:

(a) performing a polynomial discriminant weight matrix creation operation using a training character set of training character images;

(b) testing the weight matrix to determine classification accuracy;

(c) modifying the training character set responsive to the testing by increasing representation of a character that is incorrectly classified or distinguished in classification strength from an incorrect classification by less than a difference;

(d) repeating steps (a)–(c) for a number of iterations; and (e) classifying an unclassified character in an image using the weight matrix.

2. A method as recited in claim 1, wherein step (c) further comprises:

(cii) providing a negative classification to the character with the highest incorrect classification of an incorrectly classified character or the character whose incorrect classification is above a predetermined value.

3. A method as recited in claim 1, further comprising creating a substitute training character set that has a larger number of characters than the training character set where the substitute training character set is created from the training character set by offset replication and step (a) uses the substitute training set.

4. A method as recited in claim 3, wherein the substitute training set has a size and step (a) comprises using a larger portion of the substitute training set on each repeat.

5. A method as recited in claim 1, further comprising subsampling pixels of the characters and extracting features of the characters creating feature vectors and step (a) uses the feature vectors.

6. A method as recited in claim 5, wherein each of the feature vectors has a size and step (a) comprises using a larger portion of each of the feature vectors on each repeat.

7. A method as recited in claim 1, wherein step (a) includes creating and maintaining intermediate matrices used to create the weight matrix and step (c) includes modifying the intermediate matrices.

8. A method of character classification, comprising the steps of:

(a) creating, using a computer, a polynomial discriminant character weight matrix using a training exemplar feature vector set of features of captured character images;

(b) testing the weight matrix to determine classification accuracy;

(c) increasing representation of an exemplar in the feature vector set which is not classified correctly by repeating the exemplar;

(d) adding a negative weight for an exemplar that is classified incorrectly;

(e) repeating steps (a)–(d) for a predetermined number of iterations; and (f) classifying an unclassified character in using the weight matrix, thereby identifying the unidentified character.

9. A method, comprising the steps of:

(a) capturing classified printed character images using a printed character image capture device; and (b) using a computer for:

(b1) normalizing the images;

(b2) offset replicating the normalized images;

(b3) subsampling the super-sampled normalized images to produce a set of subsampled images;

(b4) extracting character features from the set of subsampled images to create a set of feature vectors for each of the images;

(b5) selecting a subset of the feature vector set;

(b6) selecting a prefix of each feature vector;

(b7) creating intermediate matrices for using the subset of the feature vector set and the prefix of each feature vector;

(b8) creating a weight matrix from the intermediate matrices;

(b9) testing the weight matrix using a test feature vector set with test characters;

(b10) increasing the representation of test characters by replicating the test characters in the intermediate matrices that are not correctly classified by said testing;

(b11) representing incorrect classifications for test characters negatively in the intermediate matrices;

(b12) adjusting the subset of the feature vector set selected;

(b13) adjusting the prefix of each feature vector selected; and (b14) repeating steps (b7)–(b13) a predetermined number of times.

10. A method as recited in claim 9, further comprising:

(c) capturing a printed character image of an unclassified character; and (d) classifying the unclassified character using the weight matrix.

11. A system for classifying printed characters, comprising:

image capture means for capturing images of identified printed characters as a training set and for capturing unidentified printed characters;

a computer coupled to said image capture means and comprising:

weight matrix creation means for iteratively creating a weight matrix from the identified printed characters using polynomial discrimination during which the training set is modified by increasing representation of characters that are incorrectly classified; and identification means for identifying the unidentified printed characters using the weight matrix.

12. A system for classifying data, comprising:

first capture means for capturing identified data as a training set;

a computer coupled to said first capture means and comprising weight matrix creation means for iteratively creating a weight matrix from the identified data using polynomial discrimination during which the training set is modified by increasing representation of identified data in the training set that is not correctly classified;

second capture means for capturing unidentified data; and identification means for identifying the unidentified data using the weight matrix.

13. A method of data classification, comprising the steps of:

(a) performing, using a computer, a polynomial discriminant weight matrix creation operation using a training data set of training data;

(b) testing the weight matrix using the computer to determine classification accuracy;

(c) modifying the training data set using the computer responsive to the testing by increasing representation of data that is not classified correctly;

(d) repeating steps (a)–(c) for a number of iterations; and (e) classifying unclassified data using the computer with the weight matrix.

* * * * *